United States Patent
Kurosaki et al.

(10) Patent No.: US 7,512,770 B2
(45) Date of Patent: Mar. 31, 2009

(54) BUFFERING APPARATUS AND BUFFERING METHOD USING RING BUFFER

(75) Inventors: Toshiyuki Kurosaki, Tokyo (JP); Dai Sasaki, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 210 days.

(21) Appl. No.: 11/291,491

(22) Filed: Dec. 1, 2005

(65) Prior Publication Data

US 2006/0136674 A1   Jun. 22, 2006

(30) Foreign Application Priority Data

Dec. 3, 2004   (JP) .............................. 2004-352020

(51) Int. Cl.
*G06F 12/00*   (2006.01)
(52) U.S. Cl. ...................................... 711/213; 711/113
(58) Field of Classification Search .................. None
See application file for complete search history.

(56) References Cited

U.S. PATENT DOCUMENTS

| | | | |
|---|---|---|---|
| 5,381,528 A | 1/1995 | Brunelle | |
| 5,566,317 A | 10/1996 | Treiber et al. | |
| 5,875,455 A | 2/1999 | Ito | |
| 6,151,660 A | 11/2000 | Aoki | |
| 6,408,409 B1 * | 6/2002 | Williams et al. | 714/719 |
| 6,532,513 B1 | 3/2003 | Yamamoto et al. | |
| 2004/0101320 A1 * | 5/2004 | Haramoto | 399/12 |
| 2004/0252395 A1 * | 12/2004 | Elliott et al. | 360/51 |

FOREIGN PATENT DOCUMENTS

| | | |
|---|---|---|
| EP | 0 687 978 | 12/1995 |
| JP | 2003330797 | 11/2003 |

OTHER PUBLICATIONS

European Search Report mailed Apr. 18, 2006, for corresponding European Application No. 05257424.1.
Communication pursuant to Article 96(2) EPC dated Dec. 20, 2006, for corresponding European Application No. 05 257 424.1-2212.
Notice of Reason(s) for Refusal, dated Feb. 10, 2009, for the corresponding Japanese Patent Application JP 2004-352020.

* cited by examiner

*Primary Examiner*—Kevin Verbrugge
(74) *Attorney, Agent, or Firm*—Katten Muchin Rosenman LLP

(57) ABSTRACT

A read unit in a buffering apparatus writes data in a memory apparatus used as a ring buffer. A determination unit determines whether data is consecutively written in the memory apparatus. When it in determined that data in consecutively written, the determination unit, in response to a request for transfer of data from a central processing unit, directs the read unit to read ahead data that follows the data requested to be transferred. In response to a request to read ahead, the read unit reads ahead the data from a recording medium and writes the data thus read ahead in the memory apparatus. In response to the instruction to read ahead, the read unit reads ahead a predetermined amount of data that follows the data requested to be transferred.

13 Claims, 7 Drawing Sheets

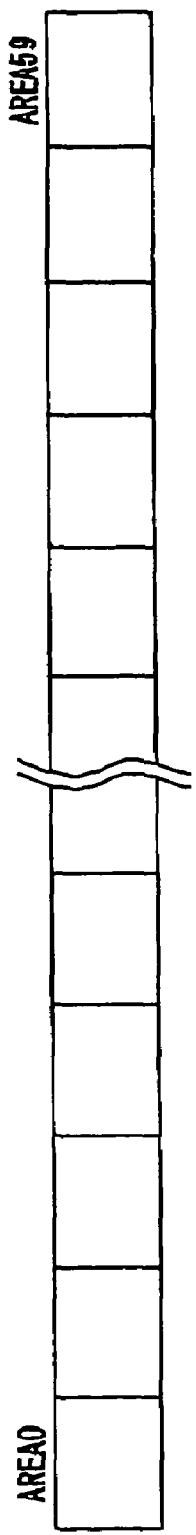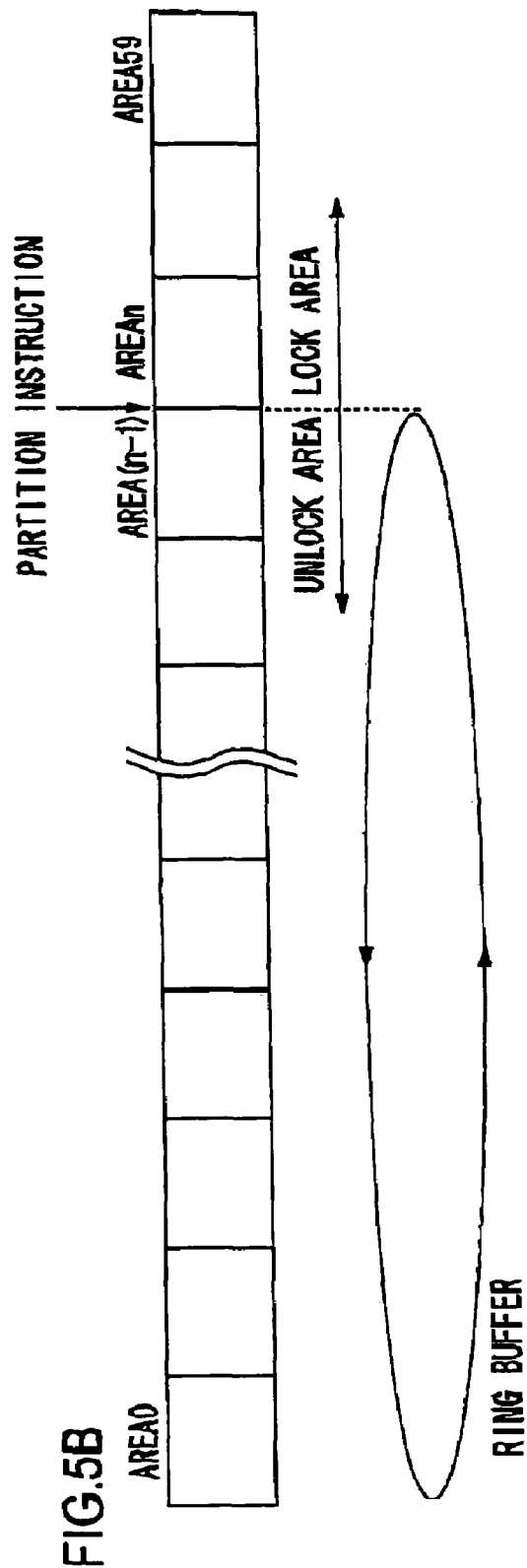

FIG.6A

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| POINTER | | | | | | | | | | | |

FIG.6B

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 16-31 | 32-47 | 48-63 | POINTER | | | | | | | |

FIG.6C

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 16-31 | 32-47 | 48-63 | 64-79 | POINTER | | | | | | |

FIG.6D

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 16-31 | 32-47 | 48-63 | 64-79 | 96-111 | 112-127 | 128-143 | 144-159 | POINTER | | |

FIG.7A

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 16-31 | 32-47 | 48-63 | 64-79 | 100-115 | POINTER | | | | | |

FIG.7B

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 1600-1615 | 32-47 | 16-31 | 64-79 | POINTER | | | | | | |

FIG.7C

| AREA0 | AREA1 | AREA2 | AREA3 | AREA4 | AREA5 | AREA6 | AREA7 | AREA8 | AREA9 | ... | AREA(n-1) |
|---|---|---|---|---|---|---|---|---|---|---|---|
| 0-15 | 16-31 | 32-47 | 48-63 | 0-15 | 100-115 | POINTER | | | | | |

BUFFERING APPARATUS AND BUFFERING METHOD USING RING BUFFER

BACKGROUND OF THE INVENTION

1. Field of the Invention

The present invention relates to a buffering apparatus and buffering method and, more particularly, to a buffering apparatus and buffering method using a ring buffer.

2. Description of the Related Art

Recently, portable electronic apparatuses such as portable game apparatuses and personal data assistants (PDA) have become commonly used. A portable electronic apparatus is required to have various functions in order to address a variety of user's needs.

Functions capable of reading digital data such as programs and motion picture data from a recording medium and running various applications are eagerly desired particularly recently. By implementing such functions, a portable electronic apparatus can be put to a variety of uses and becomes highly useful. In this respect, a technology capable of efficiently buffering digital data from a recording medium is called for. Implementation of a buffering technology efficiently utilizing hardware is particularly desired in portable electronic apparatuses since lightweight and low cost are required in such apparatuses. It is also important in desktop personal computers (PC) that the efficiency of buffering technology is improved.

SUMMARY OF THE INVENTION

The present invention has been made in view of the above-mentioned goal and relates to a technology for buffering digital data from a recording medium.

In one embodiment, a buffering apparatus comprises: a memory apparatus provided with a plurality of storage areas assigned consecutive identification numbers; a read unit which reads data recorded in a recording medium and writes the data in the memory apparatus; and a determination unit which determines whether the data is consecutively written in the memory apparatus.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B schematically show the structure of a memory apparatus.

FIGS. 6A-6D show how data is buffered in the memory apparatus using read instructions.

FIGS. 7A-7C show how data written in the memory apparatus is buffered.

DETAILED DESCRIPTION OF THE INVENTION

Figure 1:
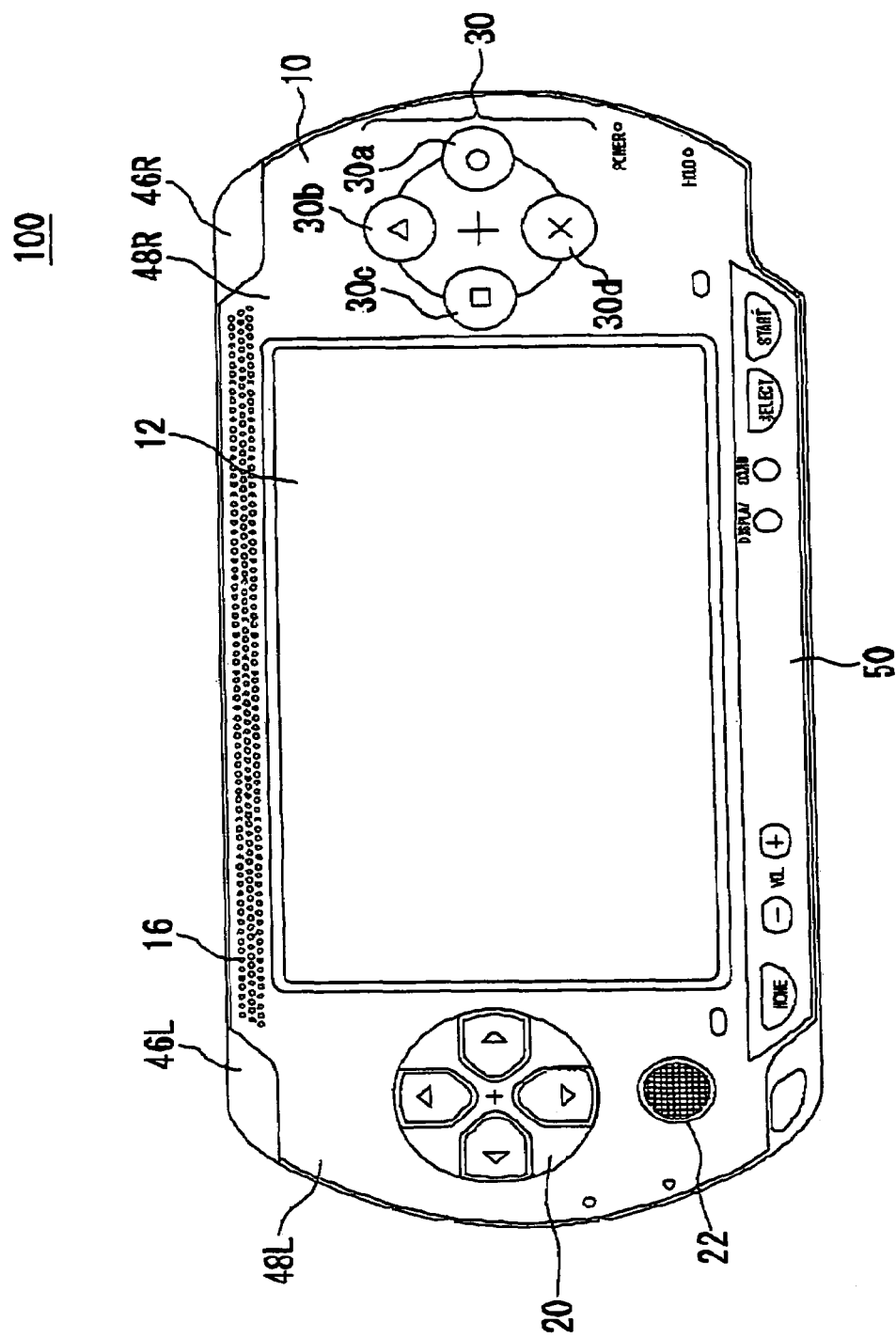
FIG. 1 is a front view of a portable electronic apparatus according to an illustrative example of the present invention.

FIG. 1 is a front view of an electronic apparatus 100 according to an embodiment of the present invention. Overall, a housing 10 of the electronic apparatus 100 is elliptically shaped and horizontally oriented. Each end of the housing 10 is curved to form an arc centered on a position displaced from the center line by a certain distance.

A liquid crystal display (herein after, referred to as "LCD") 12 is embedded as a display apparatus at the center of the housing 10. The LCD 12 displays a game screen while the electronic apparatus 100 is functioning as a game apparatus. The LCD 12 displays a schedule or an address list when the electronic apparatus 100 is functioning as a personal information terminal.

The surface of a top part 10a of the housing 10 is populated with a left-hand area 48L primarily held by the left hand of a user, a right-hand area 48R primarily held by the right hand of a user, a horizontally oriented button area 50 located below the LCD 12 and a decorated area 16 located above the LCD 12. Various buttons are arranged in the button area 50.

The left-hand area 48L is provided with an arrow key 20 primarily for providing an input for direction indication and an analog device 22 primarily for providing an analog input for direction indication. The right-hand area 48R is provided with push buttons 30a, 30b, 30c and 30d (hereinafter, sometimes generically referred to a "buttons 30 ") primarily for providing an input for a single instruction.

The button area 50 is provided in the vicinity of the outer edge of the top part of the housing 10 immediately facing the user holding the electronic apparatus 100. The button area 50 is an area in which various buttons other than the arrow key 20, the analog device 22 and the push buttons 30 are provided.

An L button 46L is a button operated by the user's left index finger or left middle finger. An R button 46R is a button operated by the user's right index finger or right middle finger. The L button 46L and the R button 46R are used to give a special instruction that can not be provided merely by the arrow key 20 or the push buttons 30.

Figure 2:
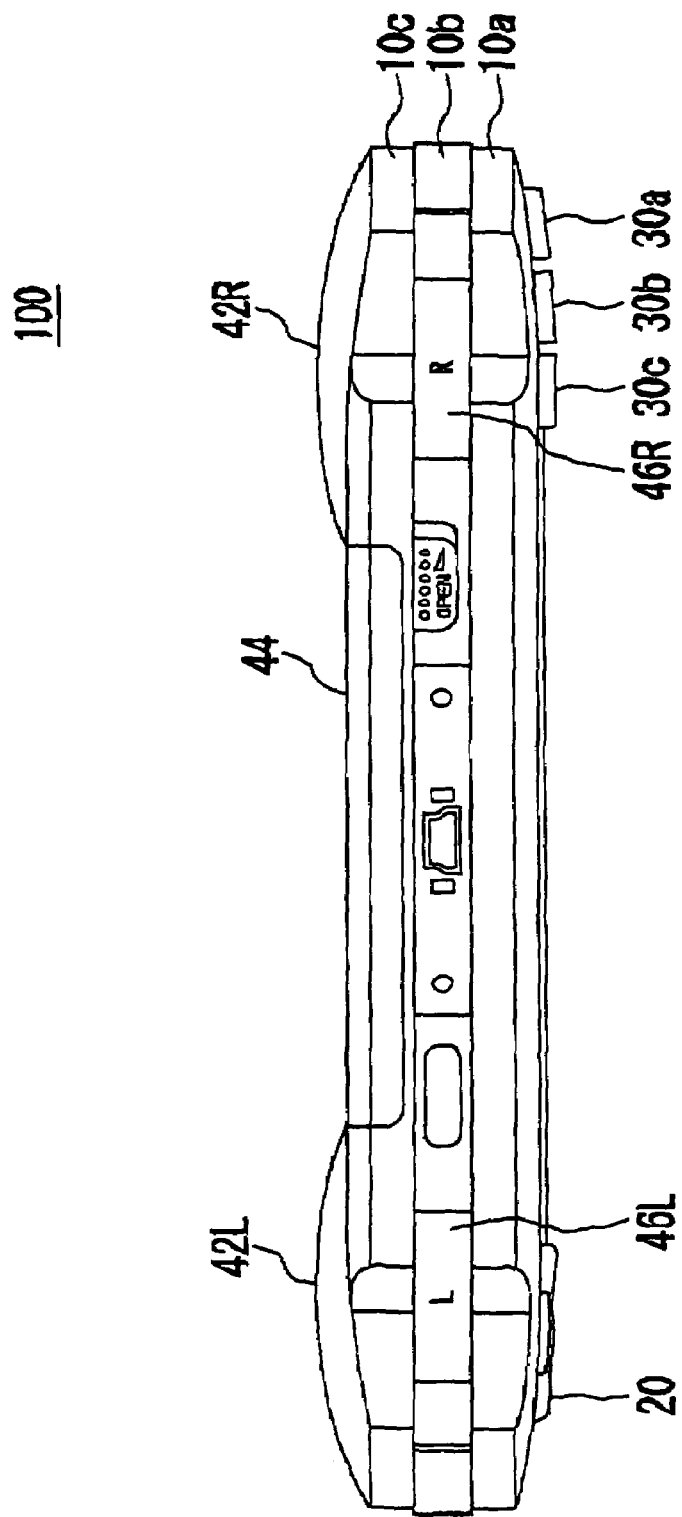
FIG. 2 is a top view of the portable electronic apparatus.

FIG. 2 is a top view of the electronic apparatus 100 according to the embodiment. The housing 10 is comprised of the top part 10a, a middle part 10b and a bottom part 10c. Inside the housing 10 is built a circuit board (not shown) carrying components including switch nodes generating signals initiated by button operations and a central processing unit for processing the signals and executing various operations accordingly. The circuit board (not shown) is fixed to the top part 10a and the bottom part 10c. The middle part 10b is more rigid than the top part 10a and the bottom part 10c, securing the rigidity of the housing 10 as a whole.

Bulges 42L and 42R are formed at both ends of the back of the housing 10. In between the bulges 42L and 42R is formed a flat surface, substantially the entirety of which constitutes a cover 44 for a small-sized disk drive. The cover 44 opens toward the top of FIG. 2 by sliding an OPEN switch provided in the middle part 10b. A disk is removably mounted in a small-sized disk drive (not shown) located below the cover 44. The disk provides an application program or a game program run on the portable electronic apparatus 100, or motion picture data for playback or music data for playback.

The electronic apparatus 100 according to the embodiment can function as a variety of types of apparatuses in accordance with a program and data stored in the disk 80. If the disk stores a game program, the electronic apparatus 100 functions as a game apparatus. If the disk stores music, the electronic apparatus 100 functions as an audio player. If the disk stores motion picture data, the electronic apparatus 100 functions as a motion picture player. The user can enjoy video contents such as movies. The electronic apparatus 100 is also equipped with wireless communication function and is capable of downloading data from an external source and transmitting date to an external destination.

Figure 3:
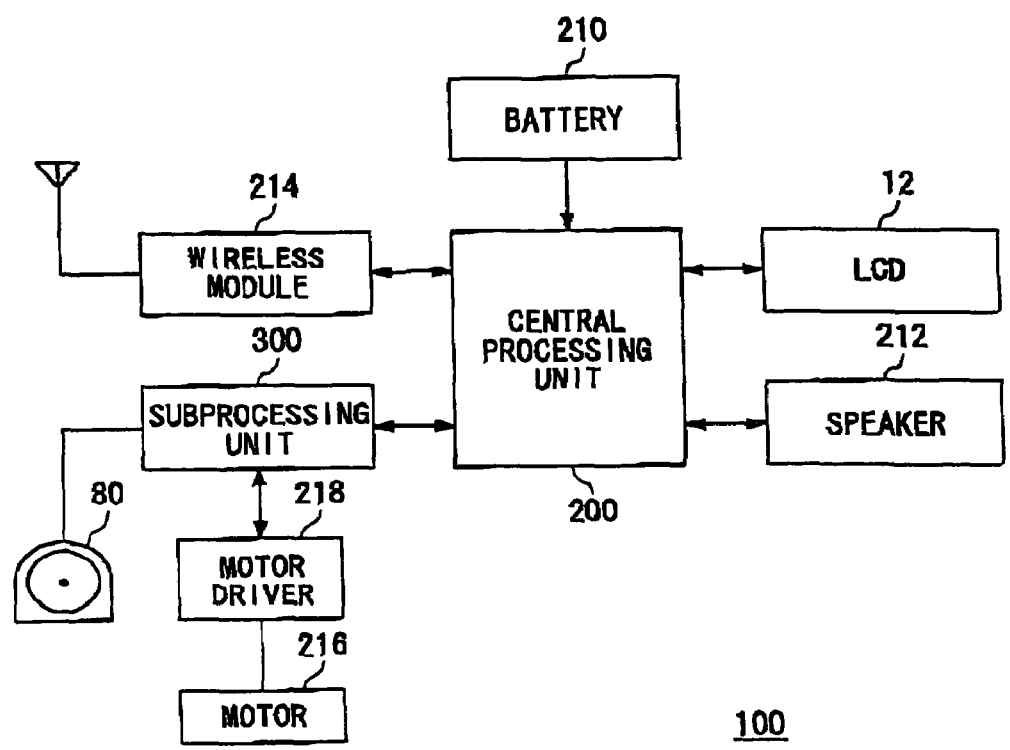
FIG. 3 shows the hardware structure of the portable electronic apparatus.

FIG. 3 shows the hardware structure of the electronic apparatus 100 according to the embodiment. The portable electronic apparatus 100 comprises the central processing unit 200 for controlling the whole apparatus, a battery 210 for supplying electric power to the whole apparatus, an LCD 12 which is a display apparatus, the speaker 212 for providing audio output, a wireless module 214 for carrying out wireless communication, a motor 216 for rotating a disk drive in which the disk 80 is mounted, a motor drive 218 for driving the motor 216 and a subprocessing unit 300 for controlling a buffering process on data and program from the disk 80. Data and programs will be inclusively referred to as "digital data" or simply "data".

The subprocessing unit 300 reads data stored in the disk 80 and temporarily stores the same in a memory apparatus. The subprocessing unit 300 then outputs the data to the central processing unit 200. The portable electronic apparatus 100 according to the illustrative example of the invention is capable of efficiently reading data into the memory apparatus and transferring data from the memory apparatus.

The buffering function explained in this illustrative example of the invention is effectively used particularly in the portable electronic apparatus 100. Since lightweight and low cost are required in the portable electronic apparatus 100, a high-speed CPU or a large-capacity memory apparatus cannot be mounted in the apparatus. Therefore, hardware resources have to be used efficiently. The inventive, effective buffering function may also be used in a desktop personal computer (PC) in which a high-speed CPU or a large-capacity memory apparatus are mounted.

Figure 4:
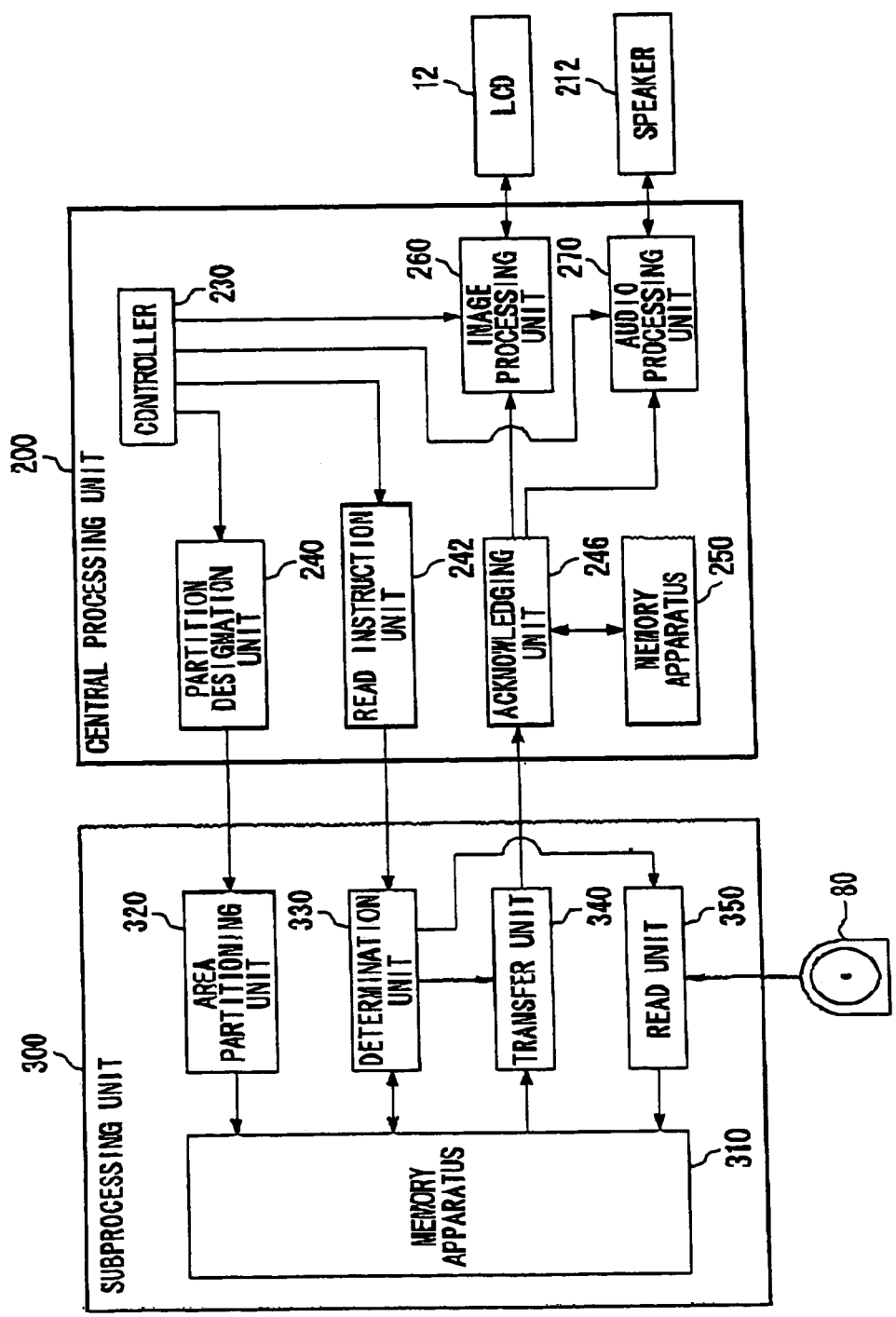
FIG. 4 shows the structure of a central processing unit and a subprocessing unit in the portable electronic apparatus according to the illustrative example of the invention.

FIG. 4 shows the structure of the central processing unit and the subprocessing unit in the portable electronic apparatus according to the illustrative example of the invention. The subprocessing unit 300 comprises a memory apparatus 310 provided with a plurality of storage areas that are assigned consecutive identification numbers, an area partitioning unit 320 for partitioning the plurality of storage areas in the memory apparatus 310, a determination unit 330 primarily for determining on the consecutiveness of digital data stored in the memory apparatus 310, a transfer unit 340 for transferring the digital data from the memory apparatus 310 to the central processing unit 200, and a read unit 350 for reading the digital data from the disk 80 and writing the data in the memory apparatus 310.

The central processing unit 200 comprises a controller 230 for controlling the overall operation, a partition designation unit 240 for generating an instruction for partitioning the plurality of storage areas in the memory apparatus 310, a read instruction unit 242 for generating an instruction for reading digital data from the disk 80 or the memory apparatus 310, an acknowledging unit 246 for acknowledging the digital data transferred, a memory apparatus 250 for temporarily storing the transferred data, an image processing unit 260 for executing an image process and an audio processing unit 270 for executing an audio process.

The structure as described above may be implemented by hardware including a CPU, a memory and an LSI and by software including a program loaded into the memory. FIG. 4 depicts functional blocks implemented by cooperation of the hardware and software. Therefore, it will be obvious to those skilled in the art that the functional blocks may be implemented by a variety of manners including hardware only, software only or a combination of both.

In FIG. 4, the image processing unit 260 and the audio processing unit 270 are included in the central processing unit 200. Alternatively, the image processing unit 260 and the audio processing unit 270 may be formed as units independent of the central processing unit 200. The functions of the central processing unit 200 and the subprocessing unit 300 may be implemented by separate CPUs or, alternatively, by a single CPU.

The memory apparatus 310 is a cache memory and is formed of an SDRAM. In the illustrative example of the invention, the capacity of the SDRAM is 16 Mbit (2 Mbyte) and the SDRAM can store an error correction code (ECC) block in each of a maximum of 60 storage areas. The ECC block is defined as a unit of storing data into the SDRAM. Digital data is recorded in units of sectors on the disk 80 and an ECC block occupies 16 sectors on the disk 80. Upon reading digital data from the disk 80, the reading unit 350 appends redundant data to the data for error correction. The reading unit 350 writes the resultant data in a predetermined area in the memory apparatus 310. The capacity of the SDRAM and the size of an ECC block are illustrative. The memory apparatus 310 may be formed of a memory other than an SDRAM.

In the illustrative example of the invention, the subprocessing unit 300 functions as a buffering apparatus that reads input data from the disk 80, temporarily stores the same in the memory apparatus 310 and then outputs the data to the central processing unit 200. The subprocessing unit 300 may achieve the buffering function by operating in cooperation with some of the functions in the central processing unit 200. In this case, the subprocessing unit 200 and the some of the functions in the central processing unit 200 function as a buffering apparatus. The destination of transfer from the memory apparatus 310 is not limited to the central processing unit 200 which is formed as a separate chip. For example, if the central processing unit 200 and the subprocessing unit 300 are formed as a single chip, the destination of transfer may be the image processing unit 260 or the audio processing unit 270 located in the same chip. If the image processing function and the audio processing function are implemented by separate chips such as an image processing unit and an audio processing unit, the destination of transfer may be the image processing unit or the audio processing unit.

FIG. 5A is a schematic diagram showing the memory apparatus 310 provided with a plurality of storage areas assigned consecutive identification numbers. An identification number is a number for specifying a storage area. The memory apparatus 310 is formed to have 60 storage areas AREA0 through AREA59. Each of the storage areas stores digital data with an error correction code. A plurality of memory devices included in each storage area are assigned addresses indicating their positions. The memory devices in the storage area with the lowest identification number are assigned addresses first. Assigning consecutive addresses to the entirety of memory devices facilitates the buffering process described later.

FIG. 5B shows how the plurality of storage areas in the memory apparatus 310 are partitioned into two areas. The two partitioned areas will be referred to as an UNLOCK area and a LOCK area. The UNLOCK area is primarily for storing sequential data. The LOCK area is for storing data permanently used in the central processing unit 200. Digital data recorded in the disk 80 is written in the UNLOCK area. Digital data recorded in the disk 80, data supplied from the central processing unit 200 and the like are written in the LOCK area. For example, motion picture data or audio data are sequentially buffered in the UNLOCK area. Permanently used data such as a directory entry of a file system is stored in the LOCK area.

The UNLOCK area in the memory apparatus 310 is formed of a plurality of storage areas identified by consecutive identification numbers. In this example, the UNLOCK area is formed of a total of n consecutive storage areas AREA 0 through AREA (n-1). In the UNLOCK area, consecutive addresses are assigned both within and across the storage areas.

The UNLOCK area is used as a ring buffer. Data sequentially read from the disk 80 is sequentially written in storage areas identified by consecutive identification numbers and used as a ring buffer. The data on the disk 80 is decoded in units of 16 sectors. The decoded data is stored in a storage area (AREA). With this, address control in reading sequential data from the UNLOCK area and transferring the same to the central processing unit 200 is facilitated. That is, for the purpose of reading sequential data from the ring buffer, what is required is to increment from a read start address one by one until a read end address is reached. As such, address management is simplified.

Immediately upon power-on of the portable electronic apparatus 100, the entirety of the storage areas is configured as the UNLOCK area. Subsequently, the controller 230 in the central processing unit 200 controls the partition designation unit 240 to partition the memory apparatus 310. The partition designation unit 240 generates an instruction for partitioning the plurality of storage areas in the memory apparatus 310 and sends the instruction to the area partitioning unit 320.

The area partitioning unit 320 partitions the plurality of storage areas in the memory apparatus 310 into the UNLOCK area and the LOCK area in accordance with the instruction for partitioning thus generated. The UNLOCK area is reserved as a ring buffer area. The plurality of storage areas in the UNLOCK area are assigned consecutive identification numbers. The area partitioning unit 320 may be provided with the function of autonomously partitioning the memory apparatus 310. In the example of FIG. 5B, the plurality of storage areas in the UNLOCK area are assigned the consecutive identification numbers 0 through (n-1). As described already, consecutive addresses are assigned within an AREA. It is also ensured that the addresses are consecutive across AREAs. Therefore, even if the UNLOCK area is formed of a plurality of AREAs, the consecutiveness of addresses is maintained.

The storage areas in the LOCK area may not be assigned consecutive identification numbers. In the example of FIG. 5B, the plurality of storage areas in the LOCK area are assigned the consecutive identification numbers n through 59. For example, the plurality of storage areas in the LOCK may be split into two blocks at the respective ends of the memory apparatus 310. The UNLOCK area is basically used for the purpose of transferring sequential data to the central processing unit 200. Therefore, it is necessary to set up consecutive storage area. In contrast, the LOCK area is not used to store sequential data and so it is not necessary to set up consecutive storage areas.

The instruction for partitioning designated a border between the UNLOCK area and the LOCK area. The instruction may designate the AREA that represents the border. More specifically, the instruction may designate the address in the memory apparatus 310 that represents the border. Alternatively, the instruction may designate the border by indicating the number of AREAs starting with AREA0 or AREA59. For example, the instruction may designate a total of (60-n) storage areas starting with AREA59 as the LOCK area. Alternatively, the instruction may designate a total of n storage areas starting with AREA0 as the UNLOCK area. By designating a border between two different areas, the area partitioning unit 320 can partition the memory apparatus 310 into different areas.

The partition designation unit 240 may set the border between the UNLOCK area and the LOCK area in accordance with the type of the disk 80. For example, considering three types of digital data including motion picture data, game program and music data, motion picture data and music data are sequential data and are recorded sequentially in consecutive segments on the disk 80 in the order of playback. As such, the consecutiveness of data is high and therefore it is preferable that a relatively large size be reserved for the UNLOCK area which stores sequential data.

In contrast, a game program yields variable outputs that depend on the user's operation. A large amount of information specific to the execution of game application such as game characters and game backgrounds is required. For this reason, as compared with sequential data such as motion picture data and music data, a relatively large amount of data should be retained in the LOCK area. Accordingly, it is preferable that the LOCK area be relatively large in size. Thus, in the case of sequential data, it is preferable that the UNLOCK area be larger in size than otherwise. Thus, the area partitioning unit 320 can set up the areas in the memory apparatus 310 in accordance with an application in the disk 80. The area partitioning unit 320 may move the boundary between the areas while an application is being run to achieve dynamic repartitioning of the areas. The dynamic repartitioning of the areas may be performed in accordance with an instruction from the partition designation unit 240. Alternatively, the use status of the memory apparatus 310 may be autonomously determined for repartitioning. When the frequency of writing of sequential data in the memory apparatus 310 is lowered, the area partitioning unit 320 may determine that the UNLOCK area can be reduced in size and repartition the areas accordingly. In this case, the range of the areas after repartitioning is reported to the controller 230 for management.

In order to store digital data in the memory apparatus 310 of the portable electronic apparatus 100, the read instruction unit 242 requests the subprocessing unit 300 to read digital data from the disk 80. The request is given in the form of read instruction and prefetch instruction.

A read instruction is a command that requests reading of digital data or reading ahead digital data. A read instruction is also a command for transferring the digital data thus read to the central processing unit 200. That is, the date directed to be read is read from the disk 80 in the subprocessing unit 300 for temporary storage in the memory apparatus 310. Concurrently, the data thus read is transferred to the central processing unit 200. In this process, a certain amount of data that follows the transferred data in sequence is read ahead from the disk 80. The amount of data read ahead is designated in a read instruction. When a read instruction is issued for the data already read ahead in the memory apparatus 310, it is not necessary to read the data from the disk 80. The memory apparatus 310 directly transfers the data to the central processing unit 200 and reads ahead a certain amount of data that follows the data in sequence.

A prefetch command requests the reading of digital data. In prefetch, read ahead and data transfer to the central processing unit 200 are not performed. The data read from the disk 80 is stored in the memory apparatus 310.

A read instruction and a prefetch instruction include a LOCK bit. When the LOCK bit is on, digital data is buffered in the LOCK area. When the LOCK bit is off, data is buffered in the UNLOCK area. The system may be designed not to allow a read instruction in which the LOCK bit is on to read ahead. This is because only fixed-size data, which does not require read ahead, is buffered in the LOCK area. If the LOCK area does not contain any data and the UNLOCK area contains data when a read instruction with the on LOCK bit occurs, the data in the UNLOCK area is copied to the LOCK area. Buffering of data in the LOCK area takes place in the increasing order of identification numbers identifying AREAs in the LOCK area reserved.

In the illustrative example of the invention, efficient buffering is achieved by inventive data read and read ahead from the disk 80 in accordance with a read instruction, which is one of two types of read requests described.

FIGS. 6A-6D show how data is buffered in the memory apparatus 310 using read instructions. A description will be given of a case where data is sequentially read from the 0th sector of the disk 80. Under the control of the controller 230, the read instruction unit 242 sends an instruction to read from the 0th sector to the subprocessing unit 300. It is assumed that no data is written yet in the UNLOCK in the memory apparatus 310.

FIG. 6A shows the UNLOCK area before any data is written therein. In the UNLOCK area that functions as a ring buffer, a pointer identifies the location of data write. The read instruction unit 242 generates a read instruction for reading digital data recorded in sectors 0-15 in the disk 80 and sends the instruction to the determination unit 330 in the subprocessing unit 300. In the illustrative example of the invention, a read instruction requests read ahead of 48 sectors of digital data. The determination unit 330 determines whether the digital data at sectors 0-15 requested to be read and transferred is located in the memory apparatus 310. In this state, the data is not written in the memory apparatus 310. Therefore, the determination unit 330 determines that the digital data at sectors 0-15 is not located in the memory apparatus 310. The determination unit 330 directs the read unit 350 to read the digital data at sectors 0-15 and to read ahead the digital data at sectors 16-63. The determination unit 330 also directs the transfer unit 340 to transfer the digital data at sectors 0-15.

FIG. 6B shows how the data read by the read unit 350 from the disk 80 in response to the read instruction for reading the data at sectors 0-15 is written in the memory apparatus 310. Firstly, the data at sectors 0-15 is written in AREA0. Once the data at sectors 0-15 directed to be transferred is written in the memory apparatus 310, the transfer unit 340 transfers the data to the acknowledging unit 246 of the central processing unit 200. The read unit 350 reads ahead the data at sectors 16-63 from the disk 80 in response to a read ahead instruction and writes the data thus read ahead in AREA1, AREA2 and AREA3 in the memory apparatus 310 which are contiguous to each other. More specifically, the pointer is forwarded to AREA1 when the data at sectors 0-15 has been written in AREA0 so that the data at sectors 16-31 is written in AREA1. Similarly, the pointer is forwarded so that the data at sectors 32-47 and the data at sectors 48-63 are written in AREA2 and AREA3, respectively. When all read ahead data has been written in the memory apparatus 310, the pointer is forwarded to AREA4. Sector information of the data stored in the AREAs is managed by a cache management table (not shown) retained by the determination unit 330. The cache management table establishes correspondence between the identification numbers of the AREAs and the sector numbers recorded. FIGS. 6A-6D shows the state of the memory apparatus 310. The information shown in FIGS. 6A-6D is included in the cache management table.

The read unit 350 may read data from the disk 80 in blocks each comprising 16 sectors of data starting with a sector identified by an integral multiple of 16. If a read instruction for reading the data at sectors 10-23 is generated, the data at sectors 0-15 and the data at sectors 16-31 encompassing the data at sectors 10-23 as a whole are read. The cache management table maintains the identification numbers of the AREAs in one-to-one relationship with the sector numbers of the first sectors recorded in the AREAs, i.e., the sectors identified by integral multiples of 16. In this case, it is ensured that the data recorded at 16 consecutive sectors is sequentially written in each of the AREAs.

Subsequently, the read instruction unit 242 generates a read instruction for reading the digital data at sectors 16-31 on the disk 80 and sends the instruction to the determination unit 330 in the subprocessing unit 300. In this case, the disk 80 is assumed to record sequential data such as motion picture data for sequential playback.

The determination unit 330 determines whether the digital data at sectors 16-31 requested to be read and transferred is located in the memory apparatus 310. If the data requested to be read and transferred is already located in the memory apparatus 310, the data is not required to be read to the memory apparatus 310 again. In this case, the data is directly transferred from the memory apparatus 310. The state in which the data requested to be read and transferred is located in the memory apparatus 310 is referred to as a cache hit. In the illustrative example of the invention, cache hit occurs when the data requested by the read instruction is buffered in contiguous storage areas in the memory apparatus 310 in the order of sectors.

The determination unit 330 searches the cache management table so as to determine whether the data at sectors 16-31 is consecutively written in the memory apparatus 310. The cache management table contains cache management information indicating that the digital data at sectors 16-31, which is read ahead, is written in AREA1. The determination unit 330 determines that the digital data at sectors 16-31 is located in the memory apparatus 310 and directs the transfer unit 340 to transfer the digital data at sectors 16-31.

In order to determine whether to execute read ahead in concurrence with the aforementioned read process, the determination unit 330 determines whether the data is written in the memory apparatus 316 in a consecutive manner. The storage area closest to the pointer is searched first for the consecutiveness of data. More specifically, the determination unit 330 determines whether the consecutiveness of data beginning with the data requested to be transferred and ending with the most recently written data is fulfilled in a contiguous range of storage areas beginning with the storage area in which the sector data requested to be read and transferred is written and ending with the storage area in which the most recent data is written. The storage area in which the most recent data is written is a storage area in which data write occurs most recently in a ring buffer. In the case of FIG. 6B, AREA3 represents the storage area in which the most recent data is written. That is, the storage area in which the most recent data write occurs is the AREA immediately preceding the pointer. The storage area in which the data at sectors 16-31, which is requested to be transferred, is written is AREA1. Accordingly, the determination unit 330 determines on the consecutiveness of data beginning with AREA1 and ending with AREA3 (both inclusive).

A determination on the consecutiveness of data is made on the basis of whether data recorded in the disk 80 is written in the UNLOCK area in the order of playback. As mentioned above, the storage area closest to the pointer is searched first for the consecutiveness of data. Data is recorded at consecutive sectors on the disk 80 in the order of playback. Therefore, the determination on the consecutiveness is ultimately made by determining whether the data written in the memory apparatus 310 is located in the order of sector numbers. As mentioned above, the determination unit 330 examines the sector information in a range beginning with the AREA in which the data requested to be transferred is written and ending with the AREA immediately prior to the pointer (that is, the storage area in which the most recent data is written). If the first sector data written in each AREA is limited to that of a sector number represented by an integral multiple of 16, a determination that the consecutiveness of data is fulfilled is made when the area sector numbers at the head of the AREAs are displaced from each other by 16.

In the example of FIG. 6B, the data at sectors 16-63 is stored in a consecutive manner in a range beginning with AREA1 and ending with AREA3. Accordingly, the determination unit 330 acknowledges that it is highly appropriate to read ahead and determines that the 48 consecutive sectors of data subsequent to the data at sectors 16-31, i.e., the data at sectors 32-79 should be read ahead. In this case, the cache management table shows that the data at sectors 32-63 is already stored in the memory apparatus 310. Accordingly, the read unit 350 is directed to read ahead the digital data at the remaining sectors, i.e., sectors 64-79. Thus, real time restoration, and particularly that of sequential data, is performed smoothly by reading ahead.

FIG. 6C shows how data read by the read unit 350 from the disk 80 in response to a read instruction for reading the data at sectors 16-31 is written in the memory apparatus 310. Since the data at sector 16-31 is already located in AREA1, the read unit 35 does not read the same data again from the disk 80. The transfer unit 340 transfers the data at sectors 16-31 to the acknowledging unit 246. In response to a read ahead instruction, the read unit 350 reads ahead the data at sectors 64-79 from the disk 80 and writes the read ahead data in AREA4 that follows.

FIG. 6D shows how data read by the read unit 350 from the disk 80 in response to a read instruction for reading the data at sectors 96-111 is written in the memory apparatus 310. The determination unit 330 refers to the cache management table and determines that the data at sectors 96-111 is not located in the memory apparatus 310. That is, cache hit does not occur. Accordingly, the determination unit 330 directs the read unit 350 to read the digital data at sectors 96-111 and to read ahead the digital data at sectors 112-159. The determination unit 330 also directs the transfer unit 340 to transfer the digital data at sectors 96-111. As a result, the date at sectors 96-159 is stored in the consecutive AREAs.

The UNLOCK area is used as a ring buffer. When data write proceeds until the data is written in the AREA (n-1), data write is started over again at AREA0, the first AREA. A data write position is identified by the position of a pointer. The pointer is forwarded to the storage area with the next identification number each time data write is performed.

In the example given above, a request for read and transfer occurs for one AREA of data. A unit of read request or transfer request may not be one AREA. What is essential is that data requested to be read and transferred is consecutive. For example, if a request for read and transfer the data at sectors 50-55 occurs when the memory is in a state shown in FIG. 6C, a transfer process and a read ahead process are performed since the data is already buffered in the memory apparatus 310 and the data at sector 50 through the most recently written data are consecutively stored. In case the cache management table maintains the AREA identification numbers in one-to-one relationship with the head sector numbers represented by multiples of 16, the consecutiveness of data beginning with sector 48 and ending with the most recently written data is determined.

The amount of data read ahead is configured to be 48 sectors of data, i.e., three AREAs of data. Alternatively, a minimum read ahead data volume and a maximum read ahead data volume may be set as targets sought to be achieved in a read ahead process. For example, a minimum read ahead data volume may be 48 sectors and a maximum read ahead data volume may be 138 sectors. As long as the consecutiveness of data is fulfilled, 48 sectors of data that follows the data requested to be transferred is read ahead in the memory apparatus 310 without exception. If time allows for additional read ahead, additional 90 sectors of data is read ahead.

A unit of additional read ahead process is 16 sectors of data. Read ahead occurs in units of 16 sectors of data only when possible. By reading ahead as much data as possible, cases like instantaneous malfunction in data read can be effectively addressed. By providing for a maximum value of the amount of read ahead, the occurrence of wasteful read ahead is avoided when the central processing unit 200 no longer requires consecutive data. This is particularly important in the portable electronic apparatus 100 since it is battery driven and driving a motor for rotating the disk 80 in a wasteful read ahead process is a waste of battery power and is not favorable. According to the inventive approach to read ahead, requirements for efficient data restoration and reduction in battery power consumption are both met.

FIGS. 7A-7C show how data written in the memory apparatus 310 is buffered. It is assumed that buffering is executed in response to a prefetch instruction that does not request read ahead. A description will be given below of a specific buffering method with reference to the states of buffering illustrated in FIGS. 7A-7C.

In the state shown in FIG. 7A, the consecutiveness of data in AREA5 is maintained. However, the consecutiveness is lost between AREA5 and AREA4. When a read instruction for the data at sectors 64-79 occurs, the determination unit 330 determines that the data at sectors 64-79 is stored in AREA4 and directs the transfer unit 340 to transfer the data to the acknowledging unit 246. Since the consecutiveness of data is lost between AREA5 and AREA4, the determination unit 330 does not direct the read unit 350 to read ahead. Therefore, data transfer of the data at sectors 64-79 is performed but the subsequent data is not read ahead. This is based on a prediction that the consecutiveness of data expected to be requested will be lost since the consecutiveness of buffered data is already lost. By directly transferring data from AREA4, the read ahead data is effectively used.

If a read instruction for the data at sectors 110-115 occurs, the determination unit 330 determines that the data at sectors 110-115 is stored in AREA5 and directs the transfer unit 340 to transfer the data to the acknowledging unit 246. Since the data is consecutively written in AREA5, the determination unit 330 directs the read unit 350 to read ahead the data at sectors 116-163.

If a read instruction for the data at sectors 0-31 occurs when the memory is in a state shown in FIG. 7B, the determination unit 330 determines that the data at sectors 0-31 is not located in contiguous storage areas. The data at sectors 16-31 is recorded in AREA3 and the data at sectors 0-15 is recorded in AREA0. These AREAs are not contiguous to each other so that cache hit does not occur. The determination unit 330 directs the read unit 350 to read the data at sectors 0-31 and read ahead the data at sectors 32-79. The determination unit 330 also directs the transfer unit 340 to transfer the data at sectors 0-31.

If a read instruction for the data sectors 0-31 occurs when the memory is in a state shown in FIG. 7C, the determination unit 330 searches the storage area closest to the pointer first for the consecutiveness of data. AREA4 contains the data at sectors 0-15 but not the data at sectors 16-31 so that it is disregarded. Upon determining that the data at sectors 0-31 is consecutively written in AREA0 and AREA1, the determination unit 330 directs the transfer unit 340 to transfer the data at sectors 0-31. Data is not consecutively written in a range beginning with AREA 1 and ending with AREA5, in which the most recent data is written. Therefore, the determination unit 330 does direct the read unit 350 to read ahead.

As described above, data that is read ahead in response to a read instruction is sequentially buffered in the UNLOCK area in the memory apparatus 310 of the subprocessing unit 300. When cache hit occurs, transfer time is reduced as compared with a case where the data is read from the disk 80, by transferring the data from the memory apparatus 310. By imposing a certain restriction on a read ahead process, situations in which a read ahead process is conducted in a wasteful manner are avoided, thereby contributing to battery power saving.

Described above is an explanation based on the examples. The example of the invention is only illustrative in nature and it will be obvious to those skilled in the art that variations in constituting elements and processes are possible within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A buffering apparatus comprising:
  a memory apparatus provided with a plurality of storage areas assigned consecutive identification numbers;
  a read unit which reads data recorded in a recording medium and writes the data in the memory apparatus; and
  a determination unit which determines whether the data beginning with the data requested to be transferred from the memory apparatus and ending with the most recently written data is located in the order of sector numbers in a contiguous range of storage areas, and decides whether to direct the read unit to read ahead from the recording medium according to the determination.

2. The buffering apparatus according to claim 1, wherein the read unit uses the memory apparatus as a ring buffer to write the data.

3. The buffering apparatus according to claim 1, wherein, in response to a request for transfer of data, the determination unit directs the read unit to read ahead data that follows the data requested to be transferred, and, in response to a read ahead instruction, the read unit reads ahead the following data from the recording medium and writes the data thus read ahead in the memory apparatus.

4. The buffering apparatus according to claim 3, wherein, in response to the read ahead instruction, the read unit reads ahead a predetermined amount of data that follows the data requested to be transferred.

5. The buffering apparatus according to claim 3, wherein the determination unit directs the read unit to read ahead if the data beginning with the data requested to be transferred and ending with the most recently written data is located in the order of sector numbers in a contiguous range of storage areas beginning with the storage area in which the data requested to be transferred is written and ending with the storage area in which the most recent data is written.

6. The buffering apparatus according to claim 3, wherein the determination unit does not direct the read unit to read ahead if the data beginning with the data requested to be transferred and ending with the most recently written data is not located in the order of sector numbers in a contiguous range of storage areas beginning with the storage area in which the data requested to be transferred is written and ending with the storage area in which the most recent data is written.

7. The buffering apparatus according to claim 1, wherein
  the sector numbers relate to units of data stored on the recording medium, and
  the determination unit retains a management table which indicates a correspondence between the identification numbers and the sector numbers.

8. The buffering method according to claim 1, wherein the memory apparatus is partitioned into a locked area and an unlocked area, the unlocked area including the plurality of storage areas assigned consecutive identification numbers.

9. The buffering method according to claim 8, wherein:
  the locked area includes data for operating a processor; and
  the unlocked area includes data cached from a disk and operates as a ring buffer.

10. The buffering method according to claim 8, further comprising designating a partition between the locked area and the unlocked area dynamically during operation.

11. The buffering method according to claim 1, wherein the locked area does not include any of the plurality of storage areas assigned consecutive identification numbers.

12. A buffering method for a memory apparatus provided with a plurality of storage areas assigned consecutive identification numbers, comprising:
  reading data recorded in a recording medium and writing the data in the memory apparatus; and
  determining whether the data beginning with the data requested to be transferred from the memory apparatus and ending with the most recently written data is located in the order of sector numbers in a contiguous range of storage areas; and
  deciding whether to direct the read unit to read ahead from the recording medium according to the determination.

13. The buffering method according to claim 12, further comprising:
  referring to a management table which indicates a correspondence between the identification numbers and the sector numbers, in which the sector numbers relate to units of data stored on the recording medium.

* * * * *